United States Patent
Van Dijck et al.

(10) Patent No.: US 9,283,517 B2
(45) Date of Patent: Mar. 15, 2016

(54) METHOD FOR COOL DRYING

(75) Inventors: Wouter Denis Ann Van Dijck, Londerzeel (BE); Frederic Daniël Rita Van Nederkassel, Lint (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 786 days.

(21) Appl. No.: 12/514,201

(22) PCT Filed: Oct. 25, 2007

(86) PCT No.: PCT/BE2007/000116
§ 371 (c)(1),
(2), (4) Date: May 8, 2009

(87) PCT Pub. No.: WO2008/055322
PCT Pub. Date: May 15, 2008

(65) Prior Publication Data
US 2009/0320505 A1    Dec. 31, 2009

(30) Foreign Application Priority Data
Nov. 10, 2006    (BE) .................................. 2006/0544

(51) Int. Cl.
*B01D 53/26*    (2006.01)

(52) U.S. Cl.
CPC ....... *B01D 53/265* (2013.01); *F25B 2600/0251* (2013.01); *F25B 2700/02* (2013.01)

(58) Field of Classification Search
CPC ................... F25B 2600/0251; F25B 2700/02; B01D 53/265
USPC .................. 62/93, 150–151, 156, 173, 176.1, 62/176.3, 176.6, 226–227, 228.4, 62, 80, 62/83, 196.3, 401
See application file for complete search history.

(56) References Cited

U.S. PATENT DOCUMENTS

| | | | |
|---|---|---|---|
| 4,325,426 A * | 4/1982 | Otsuka et al. ................. 165/202 |
| 5,218,836 A * | 6/1993 | Jarosch ........................... 62/227 |
| 5,632,333 A | 5/1997 | Imamura et al. |
| 5,699,674 A * | 12/1997 | Lee et al. ......................... 62/115 |
| 5,992,163 A * | 11/1999 | Baruschke et al. ............. 62/156 |
| 6,116,036 A * | 9/2000 | Canavesi et al. ................ 62/227 |
| 6,393,850 B1 | 5/2002 | Vanderstraeten |
| 6,460,359 B1 * | 10/2002 | Lauwers ............. B01D 5/0039 62/176.3 |
| 6,467,292 B1 * | 10/2002 | Praxmarer et al. ........... 62/228.4 |
| 2003/0118074 A1 * | 6/2003 | Seki et al. ........................ 374/29 |
| 2006/0218944 A1 * | 10/2006 | He ........................ F24F 11/006 62/115 |

FOREIGN PATENT DOCUMENTS

| | | |
|---|---|---|
| BE | 10 11932 A3 | 3/2000 |
| BE | 10 16649 A3 | 4/2009 |
| EP | 0 899 135 A2 | 3/1999 |
| EP | 1 103 296 A1 | 5/2001 |
| JP | S62-190359 A | 8/1987 |
| JP | H06-174286 A | 6/1994 |
| JP | 2001-116374 A | 4/2001 |

* cited by examiner

*Primary Examiner* — Emmanuel Duke
(74) *Attorney, Agent, or Firm* — Bacon & Thomas, PLLC

(57) ABSTRACT

Method for cool drying gas containing water vapor, where a gas is led through a secondary part of a heat exchanger, whose primary part is an evaporator of a cooling circuit. The temperature or the dew point is measured in the environment of the place where, when cool drying, the temperature of the gas to be dried is the lowest. The above-mentioned method also has the step of switching off the cooling circuit when the decrease of the lowest measured gas temperature (LAT) or the dew point during a predetermined period of time amounts to less than a preset value (y).

12 Claims, 3 Drawing Sheets

METHOD FOR COOL DRYING

FIELD OF THE INVENTION

The present invention concerns a method for cool drying.

BACKGROUND

In particular, the present invention concerns a method for cool drying gas, in particular air, which contains water vapour, whereby this gas is led through the secondary part of a heat exchanger, whose primary part is the evaporator of a cooling circuit which also comprises a compressor driven by a motor; a condenser; an expansion means between the outlet of the condenser and the inlet of the above-mentioned evaporator.

Such methods, that are known among others from BE 1,011,932, are used among others for drying compressed air.

Compressed air, supplied for example by a compressor, is in most cases saturated with water vapour, or in other words has a relative humidity of 100%. This means that when the temperature drops under what is called the dew point, there will be condensation. The condensed water causes corrosion in pipes and tools, as a result of which the appliances may wear prematurely.

That is why compressed air is dried, which may be done by means of the above-mentioned cool drying. Also other air than compressed air or other gasses can be dried in this way.

Cool drying is based on the principle that, by lowering the air or gas temperature in the evaporator, moisture in the air or gas will condense, after which the condensed water is separated in a liquid separator and after which the air or the gas is heated again, as a result of which the air or gas will be no longer saturated.

The same is also true for other gasses than air, and each time we refer to air hereafter, the same also goes for any other gas than air.

A method for cool drying is already known, whereby based on measurements of the evaporator pressure or the evaporator temperature, the cooling circuit is switched on or off.

If it is found that there is a decrease of compressed air, the cooling circuit will be started and as soon as the take-off of compressed air stops again, also the cooling circuit is stopped again.

A disadvantage of such a known method is that the heat exchanger, after the cooling circuit has been switched off, will heat up as cooling is no longer available.

If, subsequently, compressed air is taken off while the heat exchanger is still relatively warm, temperature and dew point peaks may immediately occur in the supplied compressed air, since the gas to be dried in the heat exchanger will not be sufficiently cooled then to make the water in the gas to be dried condense at maximum capacity.

In Belgian patent application No. 2005/0310 is described a method for cool drying that offers major improvements compared to the conventional methods.

To this end, the method of BE 2005/0310 consists in measuring the temperature of the dew point in the environment of the place where the temperature of the gas to be dried is the lowest when cool drying, and in switching on and off the cooling circuit so as to always maintain the lowest gas temperature of the dew point between a predetermined minimum and maximum threshold value, whereby these threshold values are calculated on the basis of an algorithm that is a function of the measured ambient temperature.

By the lowest gas temperature or LAT is meant here the lowest temperature of the gas to be dried that occurs while cool drying and that is reached, in principle, at the outlet for the gas to be dried of the secondary part of the heat exchanger. The LAT always gives a good indication of the dew point of the gas, since there is a connection between both.

SUMMARY

The present invention aims to provide an improved method for cool drying, which represents a further optimisation of the method from BE 2005/0310.

To this end, the present invention concerns a method for cool drying a gas, in particular air, containing water vapour, whereby this gas is led through the secondary part of a heat exchanger, whose primary part is the evaporator of a cooling circuit which also comprises a compressor that is driven by a motor; a condenser; an expansion means between the outlet of the condenser and the inlet of the above-mentioned evaporator, whereby the temperature or dew point is measured in the environment of the place where the temperature of the gas to be dried is the lowest when cool drying, and whereby the above-mentioned method comprises the step of switching off the cooling circuit when the decrease of the lowest measured gas temperature or the dew point over a pre-determined time interval amounts to less than a preset value.

An advantage of such a method according to the invention is that the cooling circuit can be switched off as soon as it is detected that the lowest possible value of the lowest gas temperature or the dew point has been almost reached, which helps to save energy.

A method according to the invention preferably also comprises a step whereby the lowest measured gas temperature or the measured dew point is compared to a maximum threshold value and, if the lowest gas temperature or the dew point is situated above this maximum threshold value or deviates from it by less than a predetermined value, the cooling circuit remains switched on.

This is advantageous in that one prevents the cooling circuit from being switched off as soon as the lowest gas temperature or the dew point is situated above the maximum threshold value or deviates too little from the latter, as a result of which the lowest gas temperature would reach the maximum threshold value again too soon.

According to another preferred characteristic of the invention, the method for cool drying comprises the step of eliminating the pressure difference prevailing over the compressor of the above-mentioned cooling circuit before the cooling circuit is activated after a stop.

A major advantage thereof is that the refrigeration compressor can start quickly, as any possible starting problems due to a too large pressure difference over this refrigeration compressor are avoided.

BRIEF DESCRIPTION OF THE DRAWINGS

In order to better explain the characteristics of the present invention, the following preferred method according to the invention is described as an example only without being limitative in any way, with reference to the accompanying drawings, in which.

DETAILED DESCRIPTION OF VARIOUS EMBODIMENTS OF THE DISCLOSURE

Figure 1:
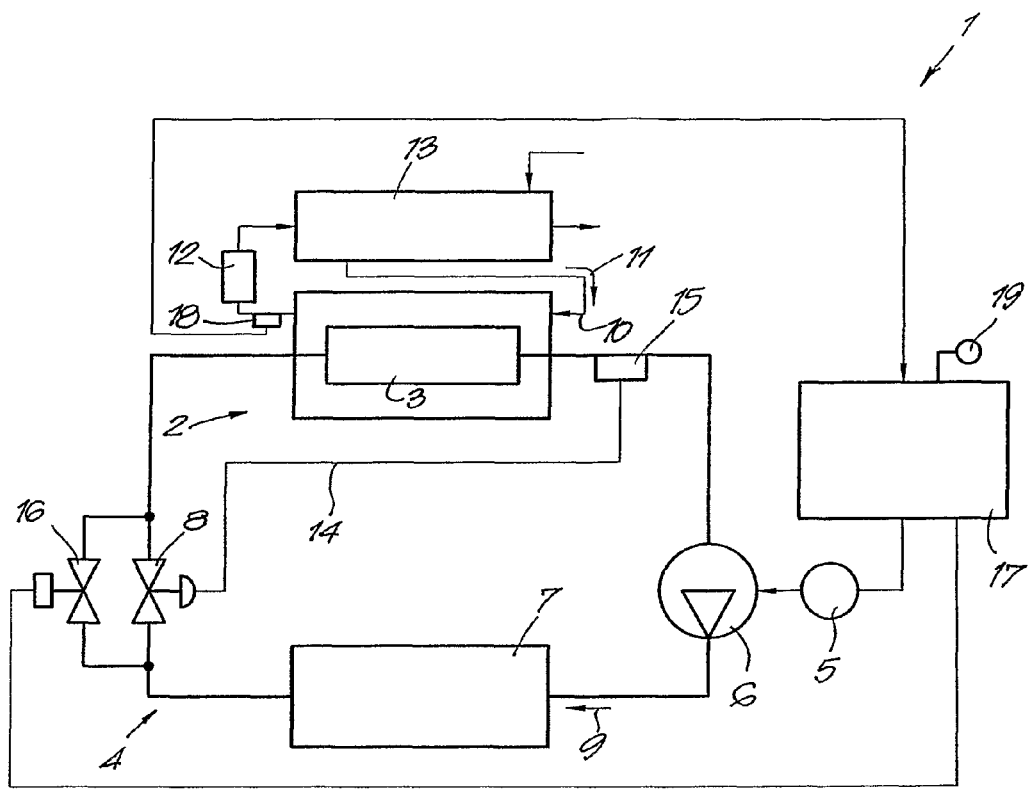
FIG. 1 represents a device for applying a method for cool drying according to the invention.

FIG. 1 represents a device 1 for cool drying which mainly consists of a heat exchanger 2 whose primary part forms the evaporator 3 of a cooling circuit 4 in which are also successively erected a compressor 6 driven by a motor 5, a condenser 7 and an expansion valve 8.

This cooling circuit is filled with cooling liquid, for example R404a, whose direction of flow is represented by the arrow 9.

The secondary part of the heat exchanger 2 is part of a pipe 10 for damp air to be dried whose direction of flow is represented by arrow 11.

Behind the heat exchanger 2, i.e. at its outlet, is erected a liquid separator 12 in the pipe 10.

This pipe 10, before it reaches the heat exchanger 2, may possibly extend with one part through a pre-cooler or recuperation heat exchanger 13 and subsequently, beyond the liquid separator 12, extend through the recuperation heat exchanger 13 again, in a parallel flow with or counter flow to the above-mentioned part.

The outlet of the above-mentioned pipe 10 can for example be connected to a compressed air network, not represented in the figures, onto which compressed air consumers are connected, such as tools that are driven by compressed air.

The heat exchanger 2 is a cooling liquid/air/heat exchanger and can be made as a whole with the possible recuperation heat exchanger 13 that is an air/air/heat exchanger.

The expansion valve 8 is in this case made in the form of a thermostatic valve whose thermostatic element is coupled in the known manner via a pipe 14 to a "bulb" 15 which is provided at the outlet of the evaporator 3, in other words between the evaporator 3 and the compressor 6, on the cooling circuit 4 and which is filled with the same cooling medium.

It is clear that the above-mentioned expansion valve 8 can be realised in many other ways, for example in the shape of an electronic valve that is coupled to a temperature gauge, erected at the far end of the evaporator 3 or beyond the latter.

In some small cooling dryers 1, the expansion valve 8 may have been replaced by a capillary tube.

In this case, but not necessarily, the cooling circuit 4 also comprises a bypass valve 16 provided parallel over the expansion valve 8 and which is in this case made in the shape of a controlled valve that is connected to a control device 17.

The compressor 6 is for example a volumetric compressor that supplies practically an identical volume flow at an identical rotational speed, for example a spiral compressor, whereas the motor 5 is in this case an electric motor that is also coupled to the above-mentioned control device 17.

The above-mentioned control device 17, which can be made for example in the form of a PLC, is also connected to measuring means 18 for the lowest air temperature LAT, and to measuring means 19 for the ambient temperature Tamb.

The above-mentioned measuring means 18 for the LAT are preferably provided there where the lowest air temperature is to be actually expected, i.e. in this case right beyond the secondary part of the heat exchanger 2, and preferably in front of the liquid separator 12.

According to the invention, it is not excluded for the measuring means 18 for measuring the LAT to be replaced by measuring means for measuring the dew point, preferably provided at the outlet of the secondary part of the above-mentioned heat exchanger 2. Further, according to the invention, each time we refer to measuring means 18 for measuring the LAT, also measuring means for measuring the dew point could be applied.

The above-mentioned measuring means 19 for the ambient temperature Tamb are preferably placed at the compressed air network which makes use of the air that has been dried by the device 1, in particular there where the final consumers of said compressed air are situated, for example near tools that are driven with this dried compressed air.

The measuring means 19 may also be provided in other places. In the case of compressed air to be dried, for example, coming from a compressor, a good spot to provide the above-mentioned measuring means 19 for the ambient temperature appears to be at the inlet of this compressor.

The method for cool drying by means of a device 1 according to FIG. 1 is very simple and as follows.

The air to be dried is led through the pipe 10 and thus through the heat exchanger 2, for example counter flow to the cooling fluid in the evaporator 3 of the cooling circuit 4.

In this heat exchanger 2, the damp air is cooled, as a result of which condensate is formed which is separated in the liquid separator 12.

The cold air that contains less moisture in absolute terms beyond this liquid separator 12, but still has a relative humidity of 100%, is heated in the recuperation heat exchanger 13, as a result of which the relative humidity drops to preferably less than 50%, whereas the fresh air to be dried is already partly cooled in the recuperation heat exchanger 13 before being supplied to the heat exchanger 2.

Thus, the air at the outlet of the recuperation heat exchanger 13 is drier than at the inlet of the heat exchanger 2.

The LAT is preferably kept within certain limits in the known manner so as to prevent freezing of the evaporator 3 due to a too low LAT on the one hand, and to make sure that the air is still sufficiently cooled so as to make it possible for condensate to be formed on the other hand.

To this end, the cooling circuit 4 as described in BE 2005/0310 can be switched on and off on the basis of the LAT and ambient temperature measurements, for example by switching on and off the driving motor 5 of the compressor 6 of said cooling circuit 4.

In this way can be made sure that the LAT or dew point is always situated between a predetermined minimum threshold value A and a maximum threshold value B.

To this end, the temperature or dew point is measured in the environment of the place where, while cool drying, the temperature of the air to be dried is the lowest, and preferably right beyond the secondary part of the heat exchanger 2, and one or both of the above-mentioned threshold values A and/or B are calculated on the basis of an algorithm as a function of the measured ambient temperature Tamb.

According to the invention, the method for cool drying comprises the step of switching off the cooling circuit 4 when the decrease of the measured lowest gas temperature, in this case the decrease ΔLAT of the lowest air temperature, or of the dew point amounts to less than a preset value during a predetermined period of time.

Figure 2:
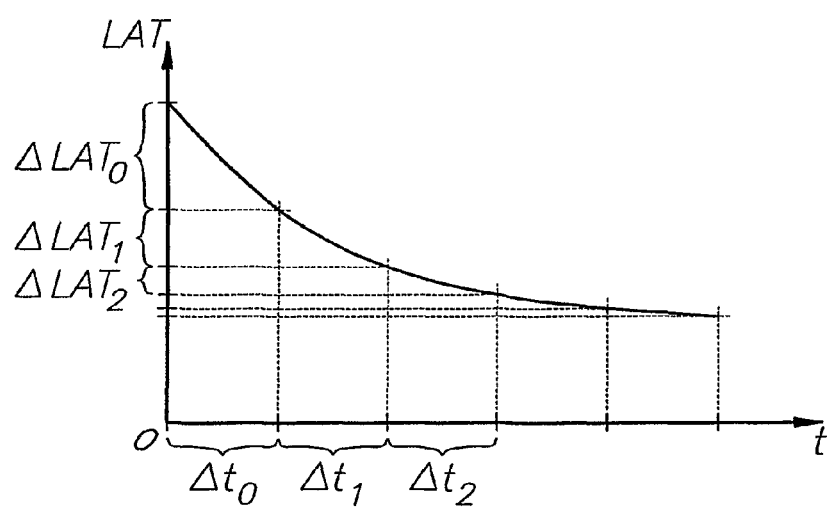
FIG. 2 schematically represents the course of the lowest gas temperature as a function of time.

This is represented by means of FIG. 2, in which the decrease of the lowest air temperature LAT, after the cooling circuit 4 has been started, is represented as a function of time t.

In this example, the cooling circuit 4 is started at time zero, after which there is a decrease of the lowest air temperature LAT.

During the first period of time $\Delta t_0$, the decrease of the lowest air temperature amounts to $\Delta LAT_0$.

During a subsequent period of time $\Delta t_1$, which takes as long as the first period of time $\Delta t_0$, the decrease of the lowest air temperature is $\Delta LAT_1$, whereby $\Delta LAT_1$ is smaller than $\Delta LAT_0$.

In the following period of time $\Delta t_2$ which takes just as long as the two preceding periods of time, the decrease of the lowest air temperature $\Delta LAT_2$ is even smaller.

In this example, when it becomes clear that the decrease of the lowest air temperature $\Delta LAT$ amounts to less than a predetermined value y which is for example practically equal to 1° C. for three successive periods of time of for example ten seconds, the cooling circuit 4 will be switched off, for example by switching off the motor 5.

It is clear that the above-mentioned decrease of the lowest air temperature $\Delta LAT$ according to the invention must not necessarily be observed over three successive periods of time, but that it can also be considered over more or less periods of time.

Thus, it is for example possible to already switch off the cooling circuit 4 when the decrease of the lowest air temperature $\Delta LAT$ drops under a preset value y during only one period of time, or to only switch off the cooling circuit 4 when there has been a decrease $\Delta LAT$ that amounts to less than a preset value y during for example five successive periods of time.

Naturally, the above-mentioned preset value y is not restricted to 1° C., but this value can be freely selected by a user.

Also the length of the above-mentioned period of time may be set by the user and is not restricted to a length of time of ten seconds.

According to a preferred characteristic of the invention, the measured lowest air temperature LAT or the measured dew point is compared to the above-mentioned maximum threshold value B, and the cooling circuit 4 stays switched on if the lowest air temperature LAT or the dew point is situated above this maximum threshold value B or differs from it by less than a predetermined value z.

The predetermined value z can be freely selected by a user and in practice preferably amounts to some 3° C.

Preferably, in a method according to the invention, use is made of an algorithm which restricts the number of start-ups per hour of the cooling circuit 4 in order to avoid that the above-mentioned motor 5, which may be for example an electric motor, becomes overloaded due to the heat accumulation in the windings.

What precedes can be realised for example by recording the period of time that has elapsed since the last stop of the cooling circuit 4, and by keeping the cooling circuit 4 switched on as long as this period of time, expressed in minutes, is smaller than 60/n, whereby n represents the maximum admitted number of start-ups per hour of the motor 5.

However, it is also possible according to the invention to consider the above-mentioned period of time for example as of the last start-up of the cooling circuit 4.

Figure 3:
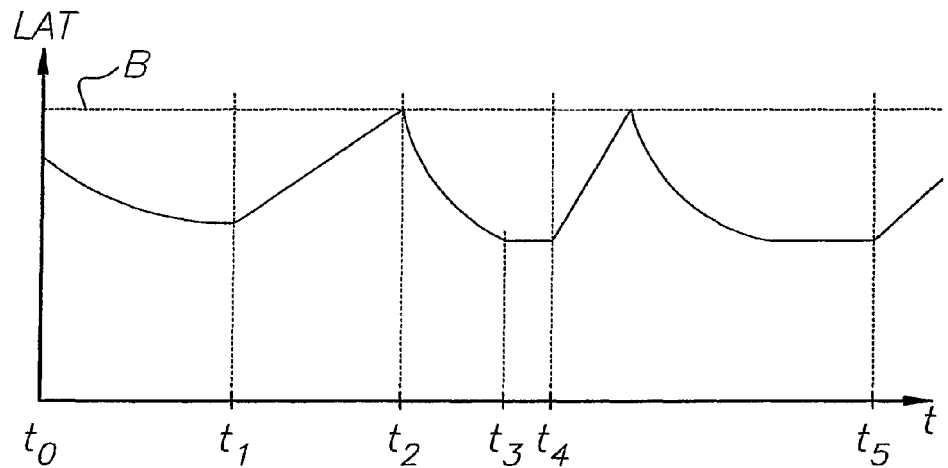
FIG. 3 schematically represents the course of the lowest gas temperature as a function of time, while a method according to the invention is being applied.

FIG. 3 schematically represents the course of the lowest air temperature LAT as a function of time t for a method according to the invention, whereby a constant inlet pressure of the gas to be dried and a constant ambient temperature Tamb are taken as a basis.

At the time $t_0$, the cooling circuit 4 is switched on, as a result of which the measured lowest air temperature LAT immediately decreases.

As soon as, for a predetermined period of time, the LAT has decreased by less than a preset value y, the cooling circuit 4 is switched off, in this case at a time $t_1$.

By switching off the cooling circuit 4, the LAT 5 increases again until it reaches the maximum threshold value B which, since a constant ambient temperature Tamb is taken as a basis, in this case is represented by a constant curve.

At that time, the cooling circuit 4 is switched on again, after which the LAT decreases again.

At the time $t_3$, the decrease of the lowest measured air temperature during a predetermined period of time amounts to less than a preset value y, such that the cooling circuit 4 will normally be switched off.

However, the period of time 60/n, which starts at the time $t_1$, in particular the time of the last stop of the cooling circuit 4, has not elapsed yet at time $t_3$, such that the cooling circuit 4 will remain switched on until this period of time 60/n has elapsed, at a time $t_4$.

At that moment, the cooling circuit 4 is switched off again and the LAT increases again.

In an analogous manner as described above, the cooling circuit 4 will be switched on as soon as the LAT has again reached the maximum threshold value B, and the cooling circuit 4 will only be switched off again when the period of time $t_5-t_4$, expressed in minutes, is equal to 60/n.

In an application with a variable ambient temperature Tamb which is not represented in the figures, the maximum threshold value B is not a constant, but it varies as a function of the ambient temperature Tamb.

In the case of a constantly varying inlet temperature and/or flow of the air to be dried entering the device 1, the cooling circuit 4 is preferably switched off when the lowest air temperature LAT is almost constant during a predetermined period of time of for example thirty seconds, for example with a deviation of less than 2° C.

According to a preferred characteristic, a method according to the invention comprises the step of eliminating the pressure difference prevailing over the compressor 6 of the above-mentioned cooling circuit 4, before the cooling circuit 4 is switched on after a stop.

To this end, the cooling circuit 4 is in this case provided with the above-mentioned bypass valve 16.

According to a preferred aspect of the invention, the bypass valve 16 is opened when the lowest air temperature reaches a threshold value C that is calculated for example is on the basis of the ambient temperature Tamb.

In a practical embodiment of a method according to the invention, the above-mentioned threshold value C may be calculated for example by subtracting a constant value from the above-mentioned maximum threshold value B.

When, with a method according to the invention, the lowest air temperature LAT increases up to the above-mentioned threshold value C after the cooling circuit 4 has been switched off, the bypass valve 16 is opened, such that the pressures in front of and beyond the compressor 6 are equalized, such that when the maximum threshold value B of the LAT is reached, the cooling circuit 4 can be started up quickly and effortlessly again as the motor is considerably less loaded.

Figure 4:
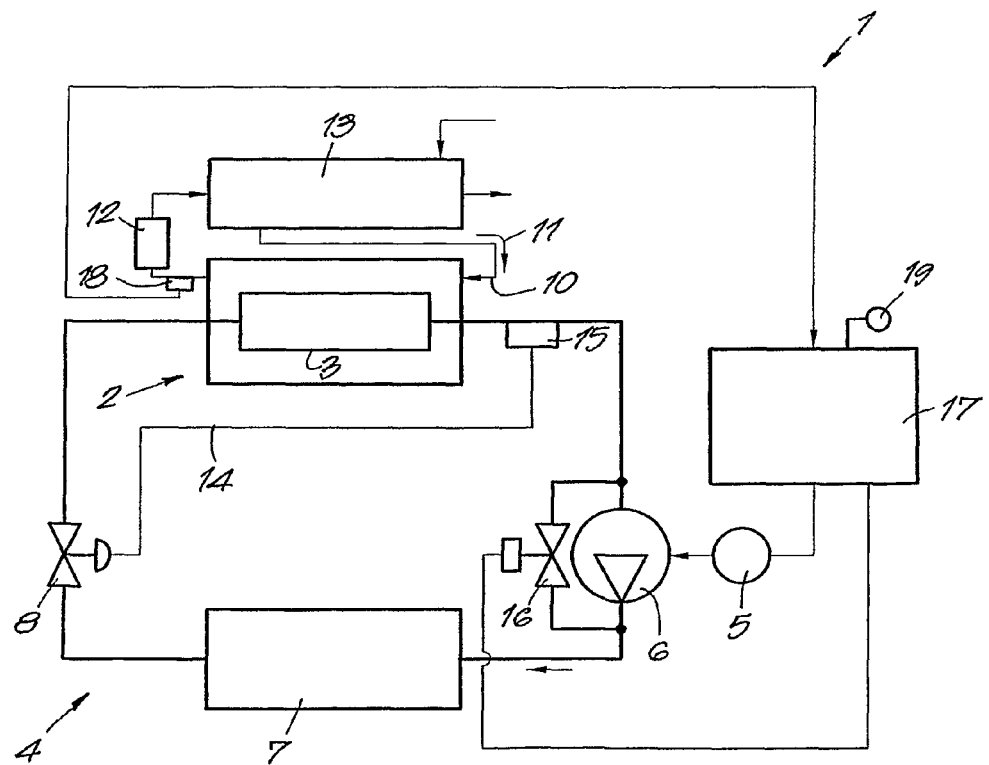
FIG. 4 represents a variant of a method according to FIG. 1.

FIG. 4 represents a variant of a device 1 according to FIG. 1 for cool drying, whereby the above-mentioned bypass valve 16 is in this case provided parallel over the above-mentioned compressor 6.

The method that is applied with such an embodiment of device 1 is analogous to the embodiment described above.

Figure 5:
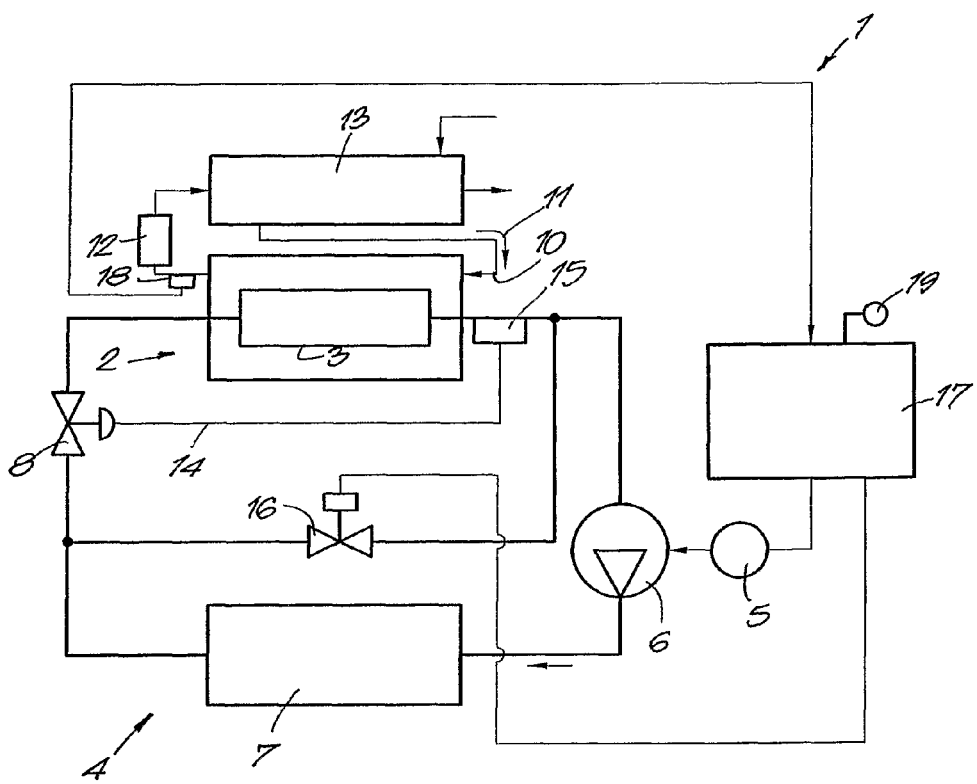
FIG. 5 represents a variant of a method according to FIG. 1, where the bypass valve is provided parallel over the expansion valve and evaporator.

FIG. 5 represents yet another embodiment of a device 1 according to FIG. 1, whereby the above-mentioned bypass valve 16 is now provided parallel over the above-mentioned expansion valve 8 and the evaporator 3.

In this case as well, the method according to the invention is the same as described above.

In the above-described examples of a method according to the invention, a combination of an energy-saving algorithm and a bypass valve 16 is always applied, but, according to the invention, it is possible to apply only the energy-saving algorithm, which switches off the cooling circuit as soon as the minimum attainable value of the LAT is approached, or only a bypass valve 16 can be provided which eliminates the pressure difference over the compressor 6 before starting the cooling circuit.

Instead of damp air, other gasses than air containing water vapour can be dried in the same manner and with the same device 1. The LAT is then the lowest gas temperature.

The present invention is by no means restricted to the method described as an example; on the contrary, such an improved method according to the invention for cool drying can be made in many different ways while still remaining within the scope of the invention.

The invention claimed is:

1. A method for cool drying gas comprising the steps: leading a gas through a secondary part of a heat exchanger comprising an evaporator of a cooling circuit which includes a compressor that is driven by a motor, a condenser, and an expansion device between an outlet of the condenser and an inlet of the evaporator; measuring a temperature or a dew point of the gas in an environment of a place where, when cool drying the gas, the temperature of the gas is the lowest; determining a change in a lowest measured gas temperature or the dew point of the gas as a function of time when the cooling circuit is started; and switching off the cooling circuit when the change in the lowest measured gas temperature or the dew point over a predetermined period of time is less than a preset value, wherein said predetermined period of time is a fixed period of time; and wherein the fixed period of time is defined as at least three successive periods of time.

2. Method according to claim 1, wherein the lowest measured gas temperature or the measured dew point is compared to a maximum threshold value and, if the lowest gas temperature or the dew point is above said maximum threshold value or deviates from it by less than a predetermined value, the cooling circuit is not switched off.

3. Method according to claim 1, including using an algorithm which restricts a number of start-ups per hour of the cooling circuit.

4. Method according to claim 3, wherein a period of time is recorded that has elapsed since a last stop of the cooling circuit, and the cooling circuit is maintained in switched on condition as long as this period of time, expressed in minutes, is smaller than $60/n$, whereby n represents the maximum number of admitted start-ups per hour.

5. Method according to claim 1, comprising the step of eliminating any pressure difference prevailing over the compressor of the cooling circuit before the cooling circuit is switched on after a stop.

6. Method according to claim 5, wherein the pressure difference over the compressor is eliminated by means of a bypass valve provided in the cooling circuit.

7. Method according to claim 6, wherein the bypass valve is provided in parallel with the expansion valve.

8. Method according to claim 6, wherein the bypass valve is provided in parallel with the compressor.

9. Method according to claim 6, wherein the bypass valve is provided in parallel with the expansion valve and the evaporator.

10. Method according to claim 6, wherein the bypass valve is opened when the lowest gas temperature or the dew point has reached a threshold value that is calculated on the basis of the ambient temperature.

11. The method according to claim 1, wherein the measuring of the temperature or dew point of the gas at the lowest is at a position beyond the secondary part of the heat exchanger in front of a liquid separator connected to a primary part of the heat exchanger for drying the gas.

12. The method according to claim 1, wherein a period of time of the three successive periods of time is ten seconds.

* * * * *